United States Patent [19]

Yamagishi et al.

[11] Patent Number: 4,640,050
[45] Date of Patent: Feb. 3, 1987

[54] AUTOMATIC SLIDING DOOR SYSTEM FOR VEHICLES

[75] Inventors: Jun Yamagishi; Hiromitu Nishikawa, both of Yokohama, Japan

[73] Assignee: Ohi Seisakusho Co., Ltd., Yokohama, Japan

[21] Appl. No.: 759,088

[22] Filed: Jul. 25, 1985

[30] Foreign Application Priority Data

Jul. 26, 1984 [JP] Japan ................................ 59-154105
Aug. 9, 1984 [JP] Japan ............................ 59-121406[U]

[51] Int. Cl.$^4$ ........................................... E05F 15/00
[52] U.S. Cl. ...................................... 49/280; 49/139; 49/213; 49/360
[58] Field of Search ............... 49/280, 213, 357, 360, 49/139; 296/155

[56] References Cited

U.S. PATENT DOCUMENTS 3,044,823  7/1962  Oishei et al. ................. 296/155 X
3,653,154  4/1972  Hayday ............................ 49/280
4,411,465  10/1983  Stuart, Jr. ....................... 49/357 X
4,462,185  7/1984  Shibuki et al. ................... 49/360 X

FOREIGN PATENT DOCUMENTS 52-55117   5/1977  Japan .
55-30060   3/1980  Japan .
57-111972  7/1982  Japan .
57-117171  7/1982  Japan .
58-28115   6/1983  Japan .

Primary Examiner—Philip C. Kannan
Attorney, Agent, or Firm—Hayes Davis & Soloway

[57] ABSTRACT

An automatic sliding door system for vehicles to operate opening and closing movements of a sliding door of a vehicle automatically and safely from a driver's seat as well as outside of the vehicle, comprises a guide rail affixed to the body so that the sliding door can be guided along the rail by sending wires firmly connected to the door by an electric motor, an operating device consisting of two parts, one being mounted near the driver's seat and another being mounted inside the body adjacent to the sliding door, a door lock releasing device mechanically or electrically connecting a door lock of the sliding door at one end and the operating device at another end through a coupling which is joint when the door is closed but separated when the door is opened, and a control device connected to the operating device to control movements of the sliding door in accordance with operation of the operating device.

12 Claims, 15 Drawing Figures

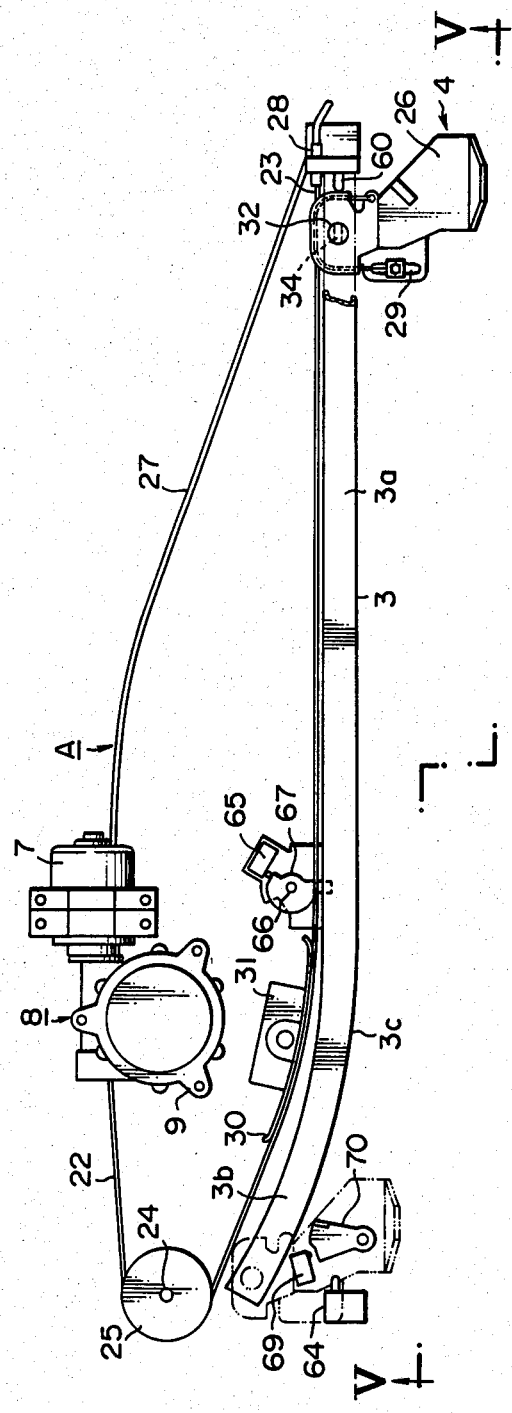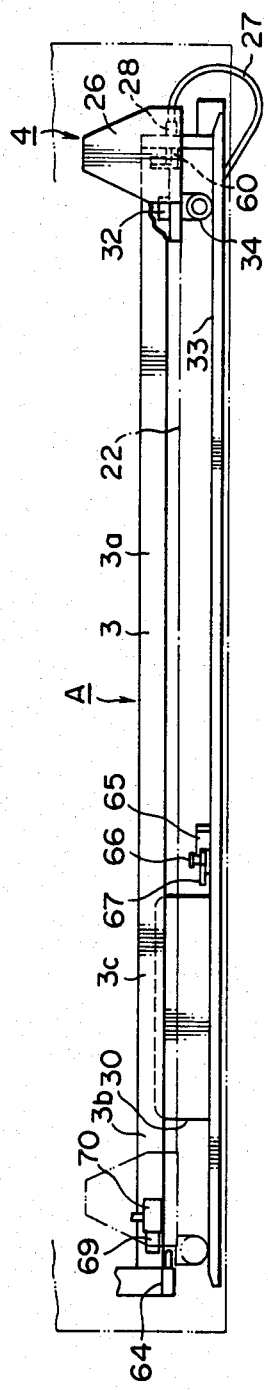
FIG.4a
FIG.5

AUTOMATIC SLIDING DOOR SYSTEM FOR VEHICLES

This invention relates to an automatic system for opening and closing a sliding door for vehicles such as van type automobiles, and particularly relates to a system in which a sliding door can be automatically unlocked and opened by one operation of an operating apparatus of the system, and also the sliding door can be closed firmly by one operation of the operating apparatus.

Previously several automatic sliding door systems have been developed, and one example of such systems has been disclosed in the Japanese Patent Application Laying-open Publication No. 58-189479, in which the system consists of a guide rail having C-shaped cross section which is fixed to a lower side of a vehicle body along a path for opening and closing movements of the sliding door, a flexible gear cable comprising a core wire with a steel wire wound up in a coil round the core said cable running through the guide rail and slidable along the axis of the rail, one end of the cable is secured to the sliding door, and the cable acts as a rack member in engagement with a pinion of driving means such as a motor, so that the cable can be sent in either directions forwardly and rearwardly along the axis of the rail by the driving means, thereby opening and closing the sliding door.

In this conventional system, the guide rail must be laid sufficiently long enough to cover the gear cable over the entire length of movement of the cable, and also the front end portion of the rail is curved toward inside of the body transversely crossing the underside of the body, so that the guide rail must be interrupted by the vehicle's propeller shaft and/or other power transmission assembly, making it difficult to design location of the guide rail.

In case of a hinged door, an operating device mounted inside the vehicle body and a door lock of the door can be quite easily interconnected with each other mechanically or electrically by leading a wire or an electric cable from the body into the door through the hinge, so it is quite easy to release the door lock automatically by operating the operating device mounted inside the body. Examples of such hinged doors are found in Japanese Patent Application Laying-open Publication Nos. 58-185873, 58-189476 and 58-191885. On the contrary, in case of a sliding door, the entire door moves almost in parallel with a side wall of a vehicle body, so that it must be quite difficult to mechanically or electrically interconnect an operating device on the body and a door lock inside the sliding door.

Therefore, an object of the present invention is to provide an automatic sliding door system which can solve the problems as described above.

More precisely, the primary object of the invention is to provide an automatic sliding door system for vehicles in which a sliding door can be automatically unlocked and opened by only one operation of an operating apparatus of the system, and also the sliding door can be closed firmly by one operation of the operating apparatus.

Another object of the invention is to provide an automatic sliding door system which is sufficiently compact to be located in a limited small space under the vehicle body without being interrupted by any components of the vehicle already mounted under the body.

Still another object of the invention is to provide an automatic sliding door system in which releasing a door lock of the sliding door precedes operation of a sliding door driving mechanism for moving the sliding door when the operating device is operated to open the sliding door.

A further object is to provide an automatic sliding door system in which the operating device on the vehicle body and the door lock within the sliding door are mechanically or electrically interconnected with each other so as to release the door lock before the sliding door starts to open.

A still further object of the invention is to provide an automatic sliding door system which operation is simple and can be easily mastered by every user.

In order to achieve the above mentioned objects, according to the invention, there is provided an automatic sliding door system for vehicles which consists of:

(A) a sliding door driving mechanism comprising:

guide means affixed to a body of a vehicle so as to guide wires along a path for opening and closing movements of a sliding door, one ends of said wires being secured to the sliding door;

a winding drum mounted to the body to be rotatable in either direction to send the wires along the guide means, in which another ends of the wires being wound round an outer circumference of said drum and secured thereto; and a driving motor mounted to the body and operatively connected to said winding drum through a speed reducer and an electromagnetic clutch;

(B) an operating device mounted on the body for operating opening and closing movements of the sliding door;

(C) a door lock releasing device comprising two parts, one of which is mounted on the body and connected to the operating device and another one of which is mounted on the sliding door and connected to a door lock of the sliding door, also comprising coupling means to connect said two parts mechanically or electrically when the door is closed, being actuated by the operating device to release engagement of the door lock prior to operation of the sliding door driving mechanism; and (D) a control device electrically connected with the driving motor, the electromagnetic clutch and the operating device, operating to energize the driving motor and the clutch so that the wires are sent in a direction to open the sliding door when the operating device is operated for opening, and also the wires are sent in another direction to close the sliding door when the operating device is operated for closing.

Other objects and features of this invention will become readily apparent from the following description of the preferred embodiments in conjunction with the accompanying drawings, in which:

FIG. 4a is a top plan view of a sliding door driving mechanism partly broken to show mounting of a bracket of the sliding door;

FIG. 5 is a side elevation of the sliding door driving mechanism looking in the direction of arrows V—V of FIG. 4a;

Figure 11A:
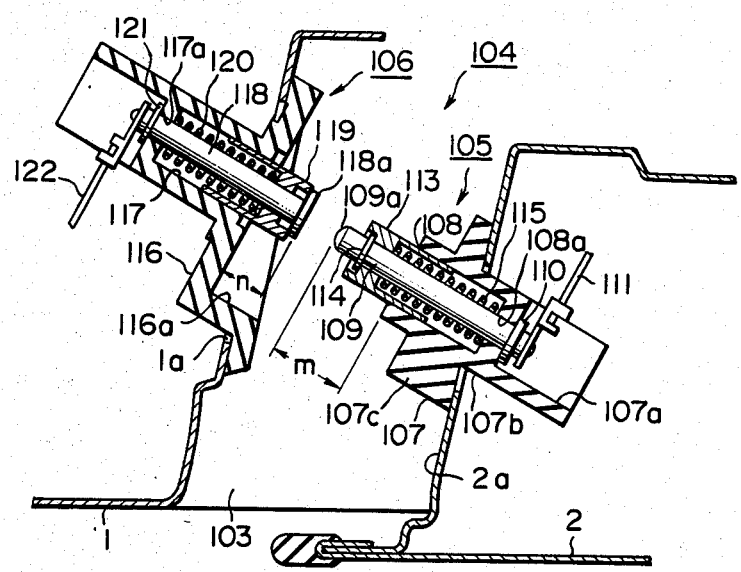
Figure 11B:
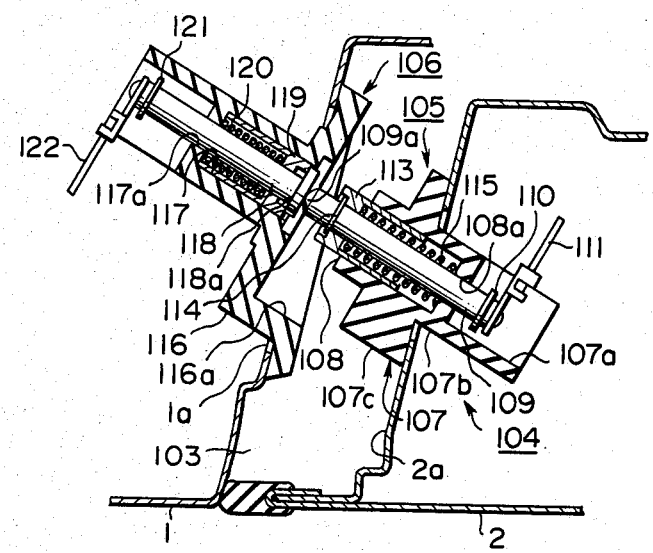
Figure 11C:
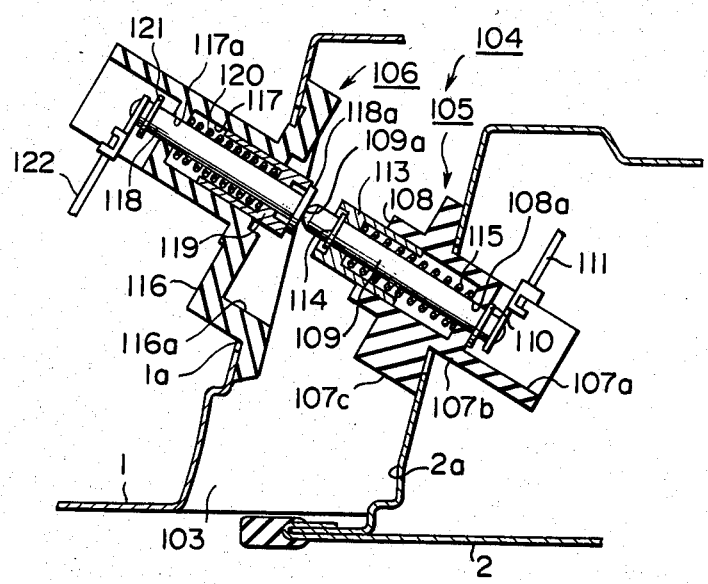
Figure 12:
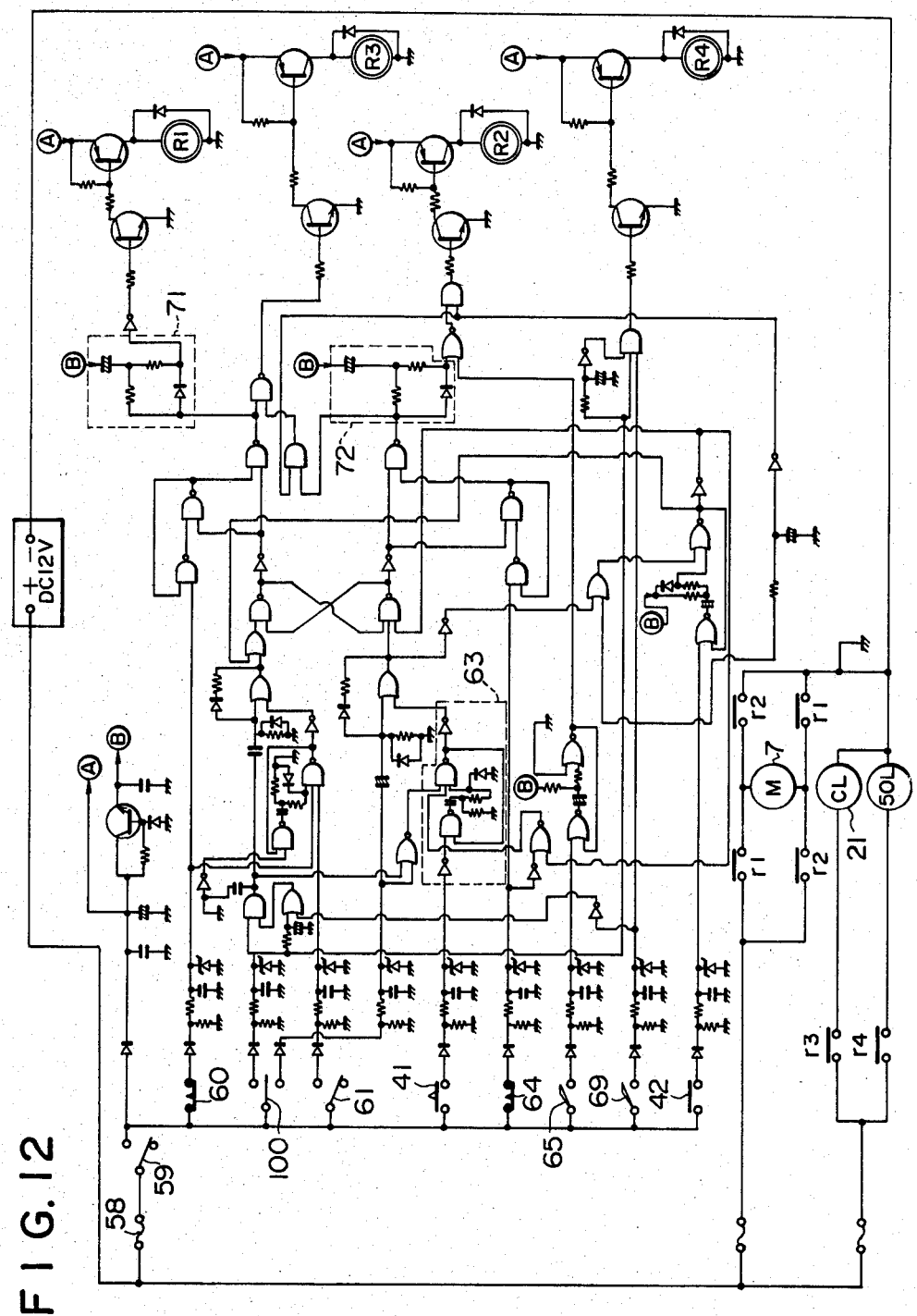

FIGS. 11a–c are sectional views of the electric coupling in operation in different states, namely with a door lock completely released when the door is opened in FIG. 11a, with the door lock firmly engaged when the door is closed in FIG. 11b, and with the door lock not completely released or engaged in FIG. 11c; and FIG. 12 is a logic diagram of an electric circuit of a control device for the second embodiment.

In the drawings, the reference 1 denotes a body of a vehicle, and the reference 2 denotes a sliding door of the vehicle.

A channel shaped lower rail 3 is affixed to the lower part of a side wall of the body extending parallel with the longitudinal axis of the vehicle. The front end portion of the lower rail is slightly curved toward inside the body 1. A lower roller device 4 is attached to the lower part of the inside surface of a front end portion of the sliding door 2 and is slidably received within the lower rail 3.

A channel shaped waist rail 5 is fixed along the middle level portion of a rear side wall of the body 1. A waist roller device 6 attached to the middle part of the rear end of the sliding door 2 is slidably received within this waist rail 5.

An upper rail (not shown) is also affixed to an upper part of the side wall of the body 1 correspondingly in relation to the lower rail 3, and an upper roller device (not shown) attached to the upper part of the inside surface of the front end portion of the sliding door 2 is slidably received within the upper rail.

Figure 1:
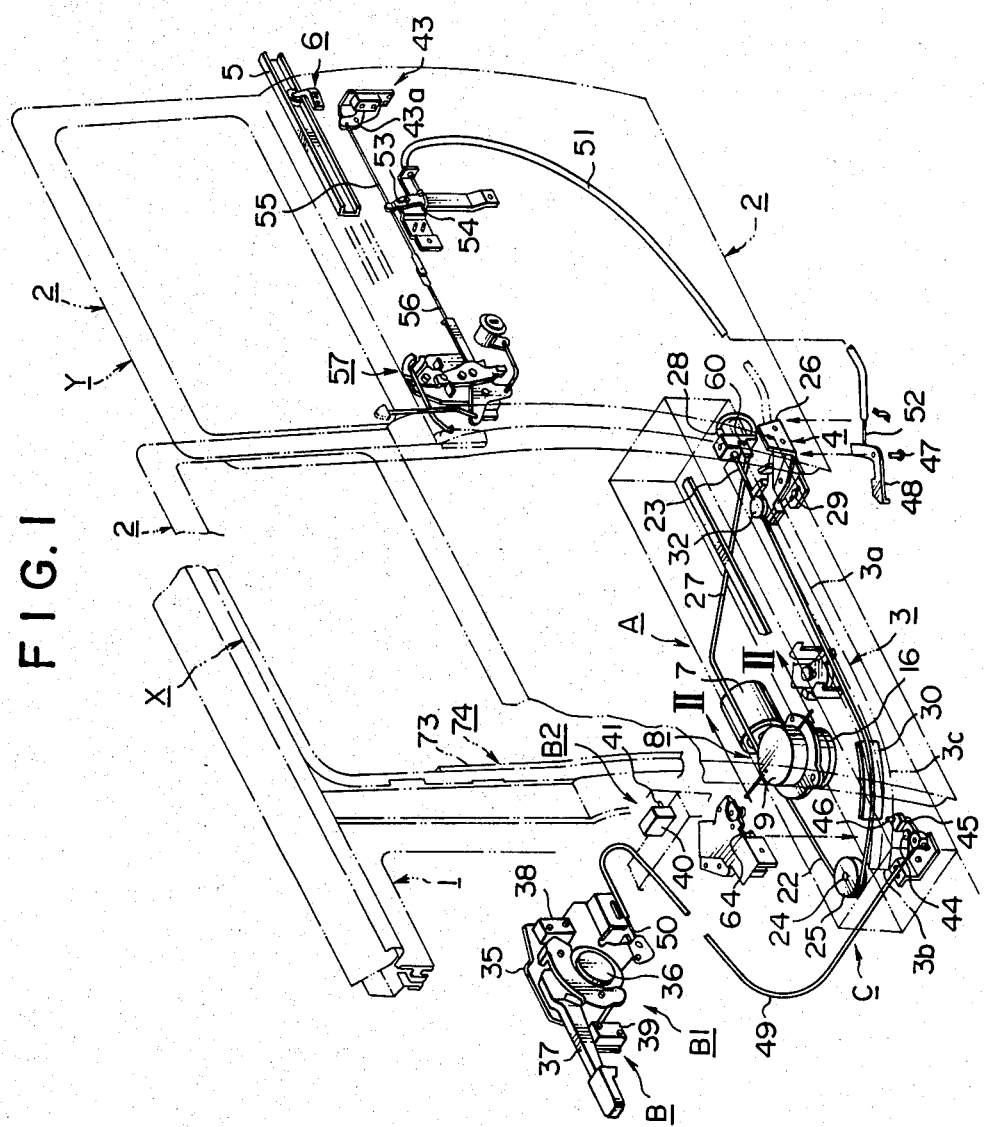
FIG. 1 is a schematic perspective view of a first embodiment of an automatic sliding door system according to the present invention used in a vehicle.

As the sliding door 2 being so mounted that the lower roller device 4, the waist roller device 6 and the upper roller device slide along the lower rail 3, the waist rail 5 and the upper rail respectively, the door must be slidingly shifted outwardly perpendicular to the body 1 from the closing position X as shown by dotted lines in FIG. 1 when it is desired to open, and then the sliding door can be moved in parallel to the rearwards to the opening position Y also shown by dotted lines in FIG. 1, and the door can be closed reversely.

The preferred embodiment of the automatic sliding door system for vehicles consists of four main components including a sliding door driving mechanism A, an operating device B, a door lock releasing device C, and a control device D, each of these components being described hereinafter.

SLIDING DOOR DRIVING MECHANISM A

The sliding door driving mechanism A for directly driving the sliding door 2 to move from the closing position X to the opening position Y or in the reverse direction, includes a reversible motor 7 attached to the underside of a floor panel of the body 1, a speed reducer 8 and an electromagnetic claw clutch internally stored within the reducer.

Figure 2:
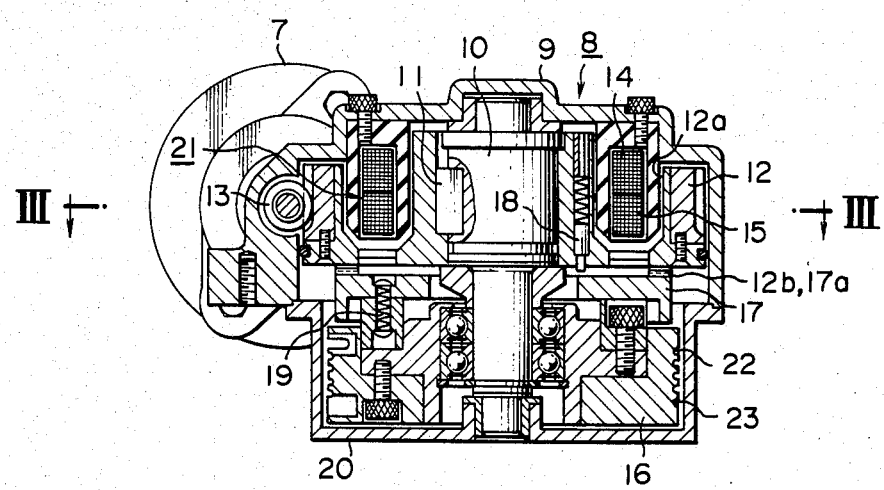
FIG. 2 is a longitudinal cross sectional view of a speed reducer along the line II—II in FIG. 1.
Figure 3:
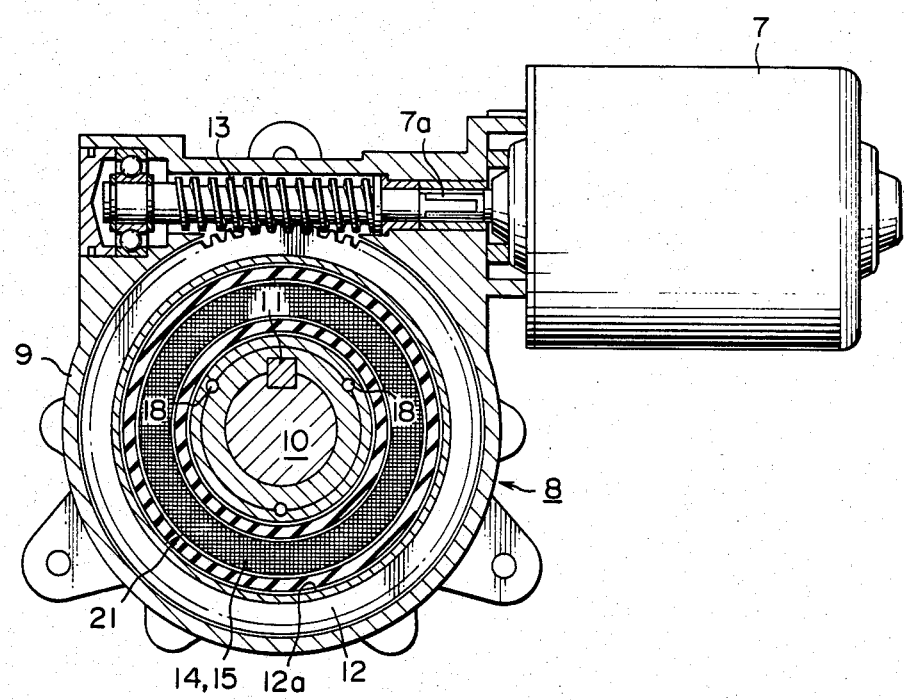
FIG. 3 is a cross sectional view of the speed reducer along the line III—III in FIG. 2.

As shown in FIGS. 1 to 3, the reducer 8 comprises a worm wheel 12 which is connected by a key 11 to a rotary shaft 10 pivoted vertically within a casing 9, and a worm 13 which is engageable with the worm wheel 12 and connected to a drive shaft 7a of the motor 7.

The worm wheel 12 is provided with an annular space 12a concentrically formed from the top surface to a position adjacent to the bottom of the wheel, and a primary coil 14 and a secondary coil 15 both fixed to the casing 9 are inserted into the space 12a.

A winding drum 16 is mounted over the lower part of the shaft 10 extending downwards below the casing 9 to be rotatable relative to the shaft, and an armature 17 is coupled to the top of the drum 16 by a splined connection so that it is movable in relation to the shaft 10 along its axial direction but not rotatable relative to the winding drum 16.

On the top surface of the armature 17 and the bottom surface of the worm wheel 12 both facing each other, teeth 17a and 12b are formed respectively in a circle concentric with the shaft 10 to be engageable with each other.

The reference 18 denotes a release plunger to pull the armature 17 apart from the worm wheel 12, the reference 19 denotes an extension spring for dragging the armature 17 towards the winding drum 16, and the reference 20 denotes a cover for the winding drum 16.

As constructed in the above, an electromagnetic claw clutch 21 is formed from the worm wheel 12 as a rotor, the primary and secondary coils 14 and 15 as exciting coils and the armature 17, in which when only the primary coil 14 is energized, the teeth 17a of the armature 17 and the teeth 12b of the worm wheel 12 are engaged with each other by relatively little drawing force of the coil to transmit the driving force of the motor 7 to the winding drum 16, and when both the primary and secondary coils 14, 15 are energized, both teeth 17a and 12b are engaged by relatively greater drawing force of both coils so that greater driving force can be transmitted to the winding drum 16.

It is also possible to use an electromagnetically operated friction clutch without teeth on both contact surfaces or other overload clutches instead of the electromagnetic claw clutch used in this embodiment, as far as the pressure between the contact surfaces can be changed electromagnetically.

Each of two wires 22 and 23 is wound round the outer circumference of the drum 16 in opposite direction each other with one end of each wire firmly connected to the winding drum 16, and then the wires are led to frontwards and rearwards of the body respectively.

Figure 7:
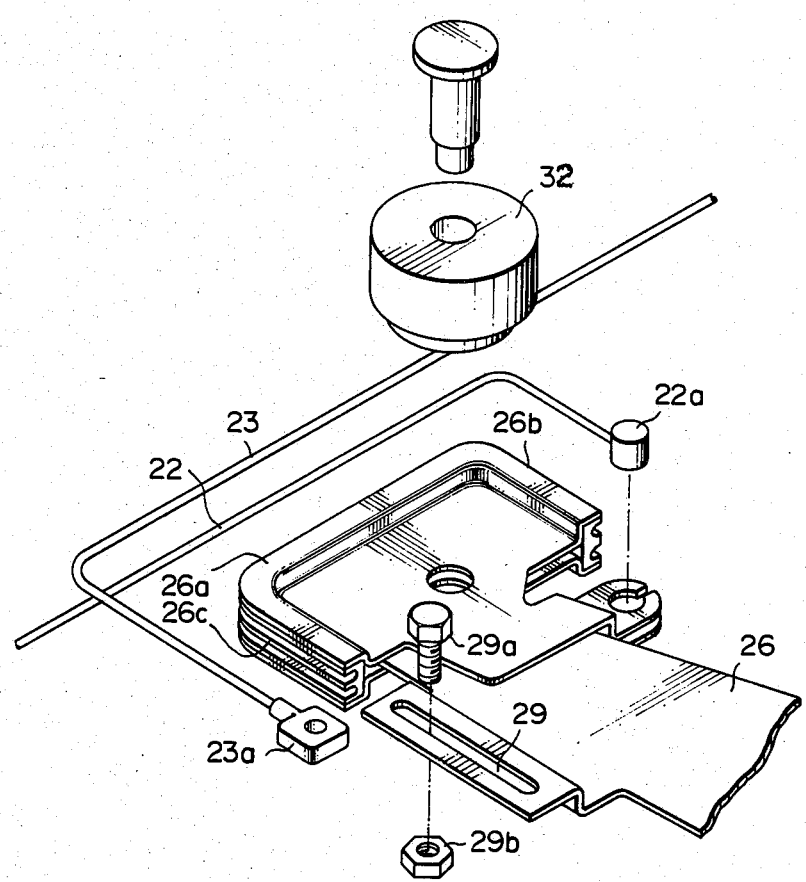
FIG. 7 is a perspective view of the bracket which is disassembled to show connection of wires of the sliding door driving mechanism to the bracket.

Referring FIGS. 4a, 5 and 7, an end 22a of the wire 22 is led frontward from the drum 16 to a guide pulley 25 pivoted on the underside of the floor panel of the body 1 by means of a vertical shaft 24, and is rounded on the pulley, and then further led to rearward. Another end 22a of the wire 22 terminates at the bracket 26 fixed to the sliding door 2, firmly connected to a rear edge 26c of a part of the bracket 26 extending toward inside of the body 1.

The other wire 23 which is led rearward from the drum 16 is passed through a flexible outer tube 27 which is curved to the front of the body, and then led further frontward through a rigid guide tube 28 which is fixed to the rear end part of the lower rail 3 in the longitudinal direction of the body. The wire 23 is further extended frontward substantially in parallel with the lower rail 3, crossing the wire 22 for a length on the inside edge 26a of the the extending part of the bracket 26, and then is led along and in contact with a front edge 26c of the extending part and secured to the bracket. An end member 23a having a hole is attached to the end of the wire 23 and is secured to the bracket 26 by means of a bolt 29a inserted through a slot 29 formed close to the front edge 26c in the bracket and a nut 29b, so that the clamping position of the end member can be adjusted.

Figure 4B:
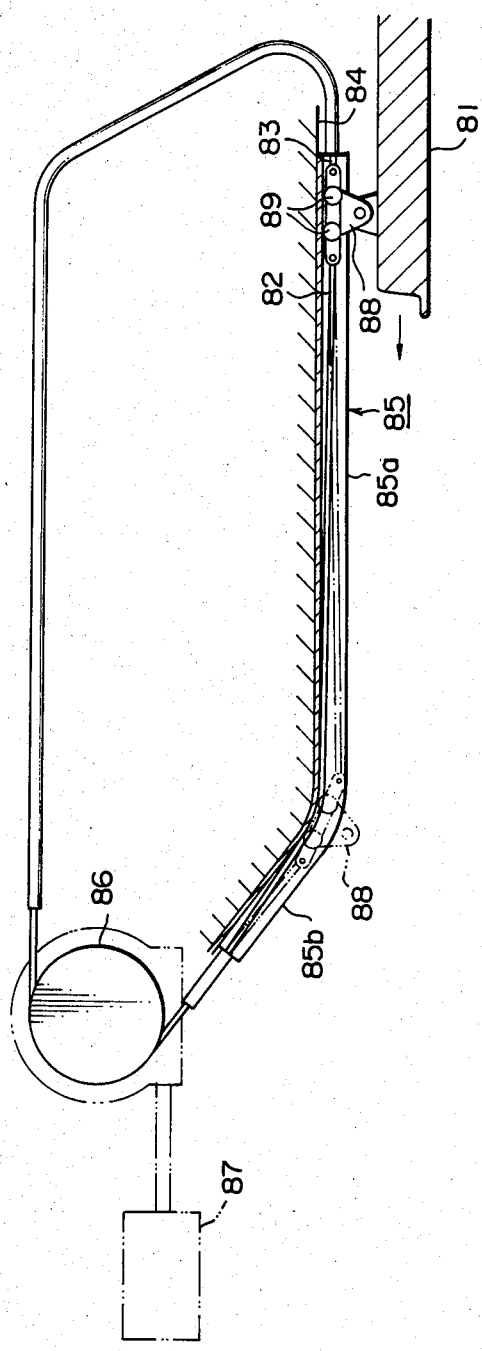
FIG. 4b is a view similar to FIG. 4a, but shows a conventional sliding door driving mechanism.

Because of this construction, the sliding door driving mechanism is advantageous over the previous mechanism, one example of which is disclosed in Japanese Patent Application No. 58-41581 of this applicant as shown in FIG. 4b. This conventional driving mechanism comprises a winding drum 86 for sending wires 82, 83 back and forth, a reversible motor 87 for rotating the drum 86 in either directions, a bracket 88 mounted to the sliding door 81, and a horizontal roller 89 which is pivoted on the bracket and rolls on and along a guide rail 85 the front portion of which is slightly curved to the inside of the body.

As shown in the drawing, the wires 82, 83 are connected at each one end to a front end and a rear end of the bracket respectively, therefore the guide rail 85 must be lengthened longitudinally in accordance with the longitudinal length of the bracket. Further, when the bracket moves along a curved portion 85b of the rail as shown in dotted lines in the drawing, the wires are pulled outwardly and are too much tensed, or the bracket interferes with inside wall of the rail to be prevented from smooth movement or completely stopped. The sliding door driving system of the invention has solved these problems and assures smooth movement of the sliding door.

In order to achieve the above purpose, the driving mechanism of the invention is further equipped with a guide plate 30 positioned at a part 3c of the curved portion of the lower rail 3 between a straight portion 3a and a curved front end 3b in order for guiding the wires 22, 23 smoothly to keep them substantially in parallel with the lower rail 3. The guide plate is fixed at the center to a bracket 31 extending downwardly from the underside of the floor panel of the body 1. Both end portions of the guide plate are formed slightly bent inward to give some flexibility when the wires are installed with tension, so that slack of the wires would be adjusted if they become loose due to the curvature of the lower rail 3. Alternatively or additionally, it is also preferred to connect the end of the wire 23 to the bracket 26 by means of a tension spring instead of the bolt and nut to adjust length of the wire.

The bracket 26 constitutes a part of the lower roller device 4, which further comprises a horizontal roller 32 pivoted on the bracket 26 to be received within the channel shaped lower rail 3 having an opening facing downward, and a vertical roller 34 also pivoted on the bracket to roll over a bottom plate 33 mounted below the lower rail 3.

As described in the above, these two wires 22, 23 are guided by the pulley 25, the outer tube 27, the tube 28 and the plate 30 to form an actually endless loop, and by rotating the winding drum 16 in a predetermined direction the sliding door 2 is moved from the closing position X to the opening position Y, and moved from the opening position to the closing position by rotating the drum reversely.

In the description hereinafter, the term "normal" is understood as referring to directions of rotations of the motor 7 and the winding drum 16 and movements of the wires 22, 23 for opening the sliding door, and the term "reverse" is for closing the sliding door.

OPERATING DEVICE B

The operating device comprises a main device B1 mounted near a driver's seat of the body 1 and a subsidiary device B2 mounted inside the body 1 near the sliding door.

The main device B1 constructed almost the same with the operating device disclosed in Japanese Patent Aplication No. 58-200023 filed by this applicant, comprising an operating handle 37 which is pivoted on a base plate 35 fixed to the body 1 by means of a shaft 36 so as to move from an almost horizontal neutral position to an open-door position with the handle slightly turned upwards and to a close-door position with the handle slightly turned downwards, and also the handle 37 being biased by spring means (not shown) to be kept at the neutral position. During the handle being retained at the open-door position a door-opening switch 38 is effected to rotate the motor 7 of the sliding door driving means in the normal direction, and during the handle being retained at the close-door position a door-closing switch 39 is effected to rotate the motor in the reverse direction.

Further descriptions for this main device B1 shall be referred to the above Japanese Patent Application No. 58-20023.

Figure 6:
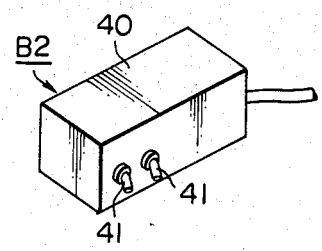
FIG. 6 is an enlarged perspective view of a subsidiary operating device in FIG. 1.

Referring to FIGS. 1 and 6, the subsidiary device B2 consists of a box 40 located at the above mentioned position, a rear door-closing switch 41 and an emergency reverse switch 42, both switches being mounted on the box 40.

The emergency reverse switch 42 is provided for the sake of safety during closing movement of the sliding door 2, and when this switch is pushed down the sliding door stops closing movement and returns to the opening position.

Operations of these switches will be described later together with operations of the control device D.

DOOR LOCK RELEASING DEVICE C

The door lock releasing device interconnects the handle 37 and a door lock 43 of any conventional type mounted to the sliding door 2. When the sliding door is closed at the closing position, by operating the handle 37 to move from the neutral position toward the open-door position, the door lock releasing device is actuated to disengage the door lock from a striker (not shown) fixed to a side wall of the body 1 before the handle reaches the open-door position. This releasing device comprises a push lever 45 pivoted at the middle part on the underside of the floor panel of the body 1 at a position close to the front end portion of the lower rail 3 by means of a vertical shaft 44, and a follower lever 48 pivoted at the middle part on the underside of the bracket 26 of the sliding door 2 by means of a vertical shaft 47, both levers being arranged such that a pin 46 projecting from the top surface of a forward end part of the push lever 45 contacts with a forward end part of the follower lever 48 when the sliding door 2 is firmly closed at the closing position.

The push lever 45 is connected at the base to the operating handle 37 through a wire 50 which is guided through a flexible outer tube 49, so that by operating the handle 37 to move from the neutral position toward the open-door position the push lever 45 can be rotated a desired angle before the handle 37 reaches the open-door position when it is desired to open the sliding door.

Both ends of the outer tube 49 are secured to the body 1 at suitable positions adjacent to the push lever 45 and the handle 37 for guiding the wire 50.

By way of a wire 52, which is guided through an outer tube 51, and an intermediate lever 54, which is pivoted on a horizontal shaft 53, within the sliding door 2, and a rod 55, the follower lever 48 is linked to a release lever 43a of the door lock 43. When the pin 46 of the push lever 45 rotates the follower lever 48 to a desired angle, the release lever 43a moves until the door lock 43 and the striker are disengaged.

The wire 52 and the intermediate lever 54 are connected with a proper slack by a well-known manner, preventing that the follower lever 48 would be actuated through the wire 52 by a central operating mechanism 57 for manual operation when the intermediate lever 54 is turned, said lever 54 being linked via a rod 56 with the mechanism 57.

The central operating mechanism 57 has not been described in details herein since it is a conventional type well known to the art and does not constitute an inventive feature of the present invention.

As described in the above, the door lock releasing device C can release the door lock 43 when the handle 37 is operated from the neutral position to the open-door position, preceding that the door-opening switch 38 is activated.

CONTROL DEVICE D

Figure 8:
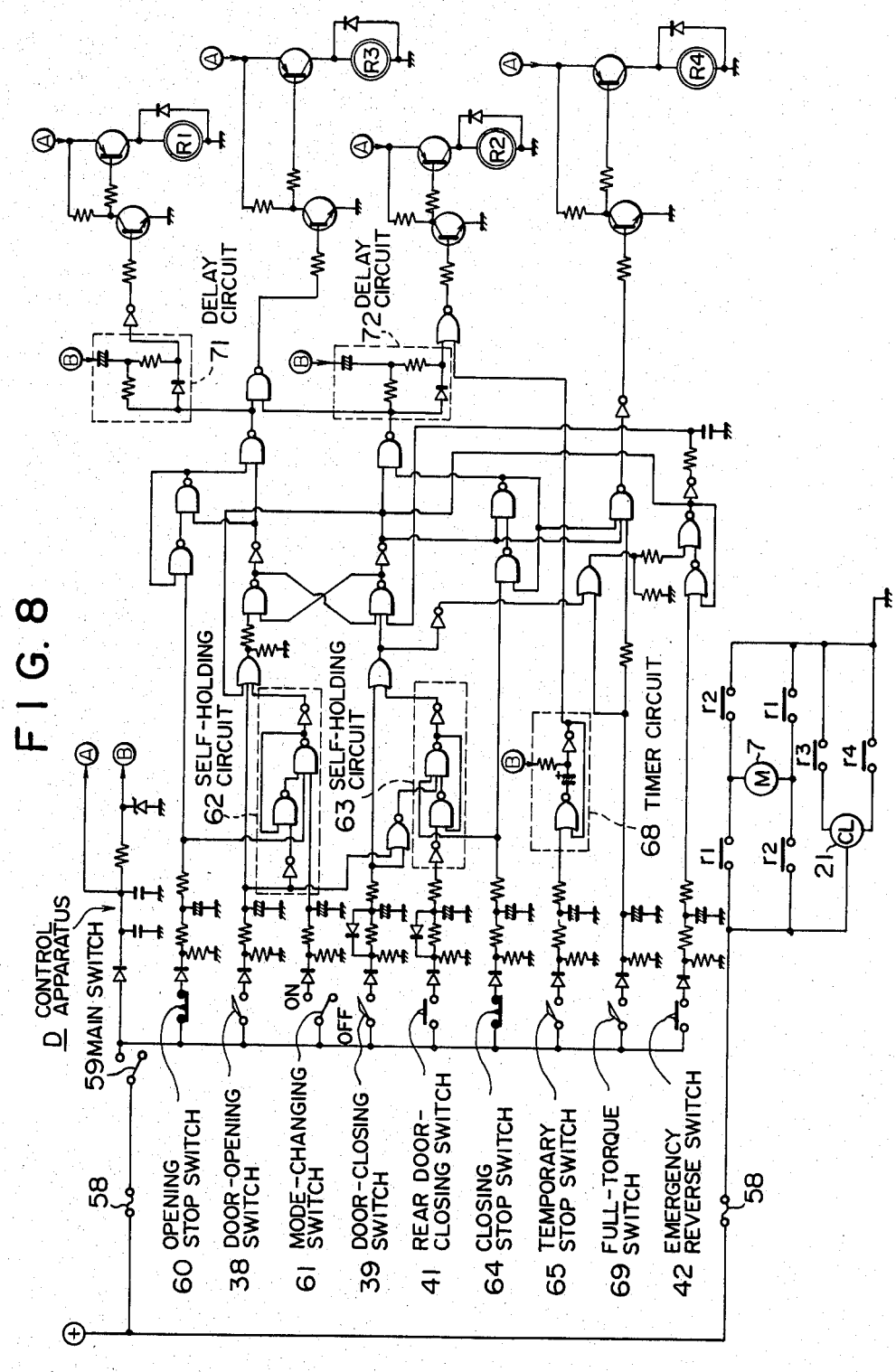
FIG. 8 is a circuit diagram of an electric circuit of a control device used in the first embodiment.

The control device D electrically controls opening and closing movements of the sliding door 2, and FIG. 8 diagrammatically illustrates a circuit for the control device by way of an example.

This circuit diagram is a logic circuit diagram using logic elements such as TTL or CMOS.

In FIG. 8, the reference 58, 59 and 60 denote a fuse, a main switch, and an opening stop switch respectively. This opening stop switch 60 consists of a limit switch which is mechanically, as shown in FIG. 4a, mounted at the rear end of the lower rail 3, and can be actuated by the bracket 26 which comes into contact with switch 60 when the sliding door 2 arrives at the opening position Y.

The reference 38 electrically illustrates the above mentioned door-opening switch 38 which operates when the handle 37 is kept at the open-door position.

The reference 61 is a mode-changing switch mounted adjacent to the driver's seat or within a control box (not shown) for adjustment by a mechanic. This switch 61 functions for changing operation modes of the door-opening switch 38 such that in case this switch is set ON, only an instantaneous closing operation of the door-opening switch 38 can move the sliding door 2 continuously to its opening movement, and in case the switch 61 is set OFF, the motor 7 rotates in the normal direction to open the sliding door 2 only during the time period when the switch 38 is held closed, and, in the middle of opening movement of the sliding door, returning the handle 37 to the neutral position stops rotation of the motor promptly so that the sliding door stops on that spot.

A self-holding circuit 62 is also provided for self-holding an operating condition of the open-door switch 38 until the sliding door 2 arrives at the opening position Y when the mode-changing switch 61 is set ON.

The reference 39 electrically illustrates the above mentioned close-door switch which operates when the handle 37 is kept at the close-door position. Only during this switch being closed, the motor 7 rotates in the reverse direction to close the sliding door, and opening this switch during this closing movement of the sliding door 2 stops rotation of the motor 7 so that the sliding door stops on that spot.

The reference 41 is the rear door-closing switch 39 for the above mentioned subsidiary operating device B2, and this switch 41 can be actuated by only instantly closing it and will be self-held during closing movement of the door until it arrives at the closing position X by the effect of a self-holding circuit 63.

When taking out a cargo and leaving the vehicle, one can close the sliding door 2 by only one push of this switch while getting out of or from outside of the vehicle even with a cargo in one's hands.

In closing the sliding door 2 by operating the switch 41, the door stops for a certain period of time before it arrives at the closing position X and after that period it resumes its closing movement from that spot to the closing position. This operation is the same as the close-door switch 39 which will be described latter.

The reference 64 denotes a closing stop switch comprising a limit switch which is mechanically mounted at the front end of the lower rail 3 as shown in FIG. 4a. This switch 64 is actuated by the bracket 26 when it comes into contact with the switch upon arrival of the sliding door 2 at the closing position X.

The reference 65 denotes a temporary stop switch comprising a limit switch which is mechanically mounted in the middle of the lower rail 3 as shown in FIGS. 1 to 4a. This switch functions as a one-way switch such that in the middle of movement of the sliding door 2 from the opening position Y to the closing position X, when the bracket 26 comes into contact with an actuating member 67 pivoted on the middle part of the lower rail 3 by means of a vertical shaft 66, the switch 65 is actuated by the member 67, and contrary in the middle of movement of the sliding door from the closing position X to the opening position Y, the switch can not be operated by the actuating member 67 even when the bracket 26 comes into contact with the member.

When the temporary stop switch 65 is closed, only the motor 7 stops temporarily for a short time, for example one second, which duration is determined by a timer circuit 68. In such circumstances, the clutch 21 is still kept connected, and the reducer 8 and the sliding door 2 are also kept connected through the clutch, the wire etc, so that the sliding door 2 which temporarily stops by the switch 65 would not go back toward the opening position by the effect of gravity even when the vehicle was stopped on an uphill road.

The reference 69 is a full-torque switch which is mounted at the front end of the lower rail 3 as shown in FIG. 4a. Just before the sliding door 2 moving from the opening position Y arrives at the closing position X, the bracket 26 of the sliding door comes into contact with an actuating member 70 to turn it, so that the switch 69 is actuated by the actuating member to energize the secondary coil 15 in addition to the primary coil 14 for increasing capacity of torque of the clutch 21.

The reference 42 denotes the above mentioned emergency reverse switch. When a passenger is about to be nipped by the sliding door 2 which is moving to the closing position, by pushing this switch 42, rotation of the motor 7 in the reverse direction can be promptly changed to the normal direction so that the sliding door moving toward the closing position goes back to the opening position Y.

The reference R1 is a relay with a contact r1 for rotating the motor 7 in the normal direction, the reference R2 is a relay with a contact r2 for rotating the motor 7 in the reverse direction, the reference R3 is a relay with a contact r3 for energizing the primary coil 14 of the clutch 21, and the reference R4 is a relay with a contact r4 for energizing the secondary coil 15 of the clutch 21.

The reference 71 is a delay circuit which operates in opening the sliding door for slightly delaying timing of energizing the relay R1 than that of energizing the relay R3 and thereby operation of the clutch 21 precedes normal rotation of the motor 7, and the reference 72 is a delay circuit which is operated in closing the sliding door for slightly delaying timing of energizing the relay R2 than that of energizing the relay R3 and thereby operation of the clutch 21 precedes reverse rotation of the motor 7.

Now, operations and functions of the whole system will be appreciated from descriptions hereinafter.

When the sliding door 2 remains at the closing position X and the handle 37 is held at the neutral position, only the opening stop switch 60 and the full-torque switch 69 are closed, and the other switches such as the door-opening switch 38, the door-closing switch 39, the rear door-closing switch 41, the closing stop switch 64, temporary stop switch 65 and the emergency reverse switch 42 are open.

The mode-changing switch 61 can be selectively changed to either ON and OFF, and in this embodiment, we are going to explain on assumption that the switch is set OFF.

Thus, none of the relays R1, R2, R3 and R4 are energized, and therefore, the motor 7 and the clutch 21 are not energized.

In such circumstances, the sliding door 2 can be manually operated to open or close in a similar manner to a vehicle without an automatic sliding door system.

According to the invention, in association with manually operated opening and closing movements of the sliding door 2, the wires 22, 23 are sent in the normal and reverse directions and the winding drum 16 is rotated in the normal and reverse directions, but the other elements are disconnected by the effect of the clutch 21, so that the sliding door 2 can be moved smoothly.

In such circumstances described above, when the main switch is on and the handle 37 is turned to the open-door position, first the door lock releasing device C releases engagement of the door lock 43 and the striker and then the door-opening switch 38 closes.

Then, the relay R3 is energized to close the contact r3 and the primary coil 14 of the clutch 21 is energized, and after a short delay time, the relay R1 is energized to close the contact r1 causing the motor 7 to rotate in the normal direction to move the sliding door 2 from the closing position X to the opening position Y.

When the sliding door 2 moves slightly from the closing position X toward the opening position Y, the opening stop switch 60 closed, and when the door further moves a small distance from there toward the opening position Y, the full-torque switch 69 opens, but these operations have no effects on smooth movements of the sliding door 2.

In the middle position between the closing position X and the opening position Y of the sliding door, the bracket 26 comes into contact with the actuating member 67 to turn it in counter-clockwise in FIG. 4a, but this will not actuate the temporary stop switch 65.

When the sliding door 2 is moving from the closing position X to the opening position Y, returning the handle 37 to the neutral position to open the open-door switch 38 promptly stops energizing to the relays R1, R3 since the mode-changing switch 61 is set OFF, causing the sliding door to stop on that spot.

Then, when the handle 37 is turned again to the open-door position to re-close the door-opening switch 38, the sliding door resumes movement toward the opening position Y while conditions of the circuit is the same as before the door stopped.

With the mode-changing switch 61 set ON, the open-door switch 38 can be self-held by the self-holding circuit 62, so that the sliding door can continue its opening movement even when the door-opening switch 38 is opened.

When the sliding door arrives at the opening position Y, the opening stop switch 60 is opened to stop energizing the relays R1, R3, and thereby the motor 7 is stopped, the clutch 21 is released, and the sliding door 2 stops there.

In this embodiment, ON and OFF operations of the opening stop switch 60 are transmitted in the form of pulse signals to change state of the circuit for energizing or breaking the relays R1, R3. Therefore, for example, when the sliding door 2 arrives at the opening position Y and comes into contact with a stopper (not shown), even if the door goes back by reaction of contacting with the stopper and thereby the opening stop switch 60 is closed again, the relays R1, R3 will not be energized again without causing so-called chattering which would happen when the driving motor and the opening door switch were directly connected.

When the operating handle 37 is returned to the neutral position after arrival of the sliding door 2 at the opening position Y, the control circuit D becomes in a resting state, so that the sliding door 2 can be operated manually to open and close as well as the case described above.

When the sliding door 2 is remaining at the opening position Y, turning the handle 37 to the door-closing position to close the door-closing switch 39 causes the relay R3 to be energized, and then after the primary coil 14 of the clutch 21 is energized, the relay R2 is energized to rotate the motor 7 in the reverse direction, so that the sliding door 2 starts to move toward the closing direction X.

The opening stop switch 60 closes when the sliding door leaves the opening position Y, but it does not influence the movement of the sliding door 2.

When the sliding door comes to the middle position between the opening position Y and the closing position X, the temporary stop switch 65 is actuated to close by the actuating member 67 which is brought in contact with the bracket 26, causing to stop energizing the relay R2 for a short time determined by the timer circuit 68, so that the sliding door temporarily stops its movement during this time.

During this short period, it is possible to remove a cargo or a passenger standing in front of the sliding door 2, and it is also possible to push the emergency reverse switch 42.

After that period, the relay R2 is energized again and the sliding door resumes to move toward the closing position X.

When the sliding door 2 is moving toward the closing position X, returning the handle 37 to the neutral position to open the door-closing switch 39 stops energizing the relays R2, R3, causing the door 2 to stop on the stop. Then the close-door switch 39 is closed again, the relays R2, R3 are energized so that the door resumes movement toward the closing position X.

Further, in closing movement of the sliding door 2 toward the closing position X, when the emergency reverse switch 42 is closed, energizing the relay R2 is stopped and the relay R1 is energized, thereby causing the motor 7 to rotate in the normal direction so that the sliding door is moved back toward the opening position Y upon the emergency reverse switch 42 is pushed.

When the sliding door 2 is moving toward the closing position X and arrives at a position shortly before the closing position, the full-torque switch 69 is actuated to close by the actuating member 70 which is brought in contact with the bracket 26.

Then, the relay R4 is also energized in addition to the relays R2, R3 which have been energized, causing both of the primary and secondary coils 14, 15 to be energized, so that higher pressure is applied to the engagement between the armature and the worm wheel of the clutch 21 and greater torque capacity for transmitting driving force of the motor 7 to the winding drum 16 is assured. Therefore, the sliding door 2 can be forcedly moved to the closing position X against reaction force in engagement of the door lock 43 and the striker, or against a weather strip.

When the sliding door arrives at the closing position X, the bracket 26 comes in contact with the closing stop switch 64 and thereby the switch is actuated to stop energizing the relays R2, R3, R4, causing the motor 7 to stop and the clutch 21 to be released, so that the sliding door 2 stops on that spot.

This operation of the closing stop switch 64 is transmitted in the form of pulse signals similar to the operation of the opening stop switch 60, preventing chattering of the door 2 which would happen when the door backs.

After the sliding door 2 has arrived at the closing position X, the control device D is put in a resting state by returning the handle 37 to the neutral position, and in such circumstances, the sliding door can be manually operated to open and close easily as described above regarding opening operation of the door.

The above described operations for closing the door is achieved by closing the door-closing switch 39. When it is desired to close the sliding door by closing the rear door-closing switch 41, this switch, once actuated, can be self-held by the self-holding circuit 63 even if a hand pushing the switch is released during closing movement of the door. Therefore, the sliding door 2 continues its movement toward the closing position X without stopping except the temporary stop by the operation of the temporary stop switch 65 as described above and when the emergency reverse switch 42 is operated.

Furthermore, in consideration of safety, as shown in FIG. 1, it is also preferred to provide a safety switch 74 which may comprise a vertically extending bar member 73 mounted on the rear end surface of a pillar of the body 1 to be retractable into and out of the pillar by means of a spring, facing to the front end of the sliding door 2, or a pressure sensitive switch in the form of a strip. In this case, the safety switch 74 can be actuated when a cargo or a human body is caught in the sliding door so as to stop operation of the motor 7 and the clutch 21 or to reverse closing movement of the sliding door toward the opening position Y.

Figure 9:
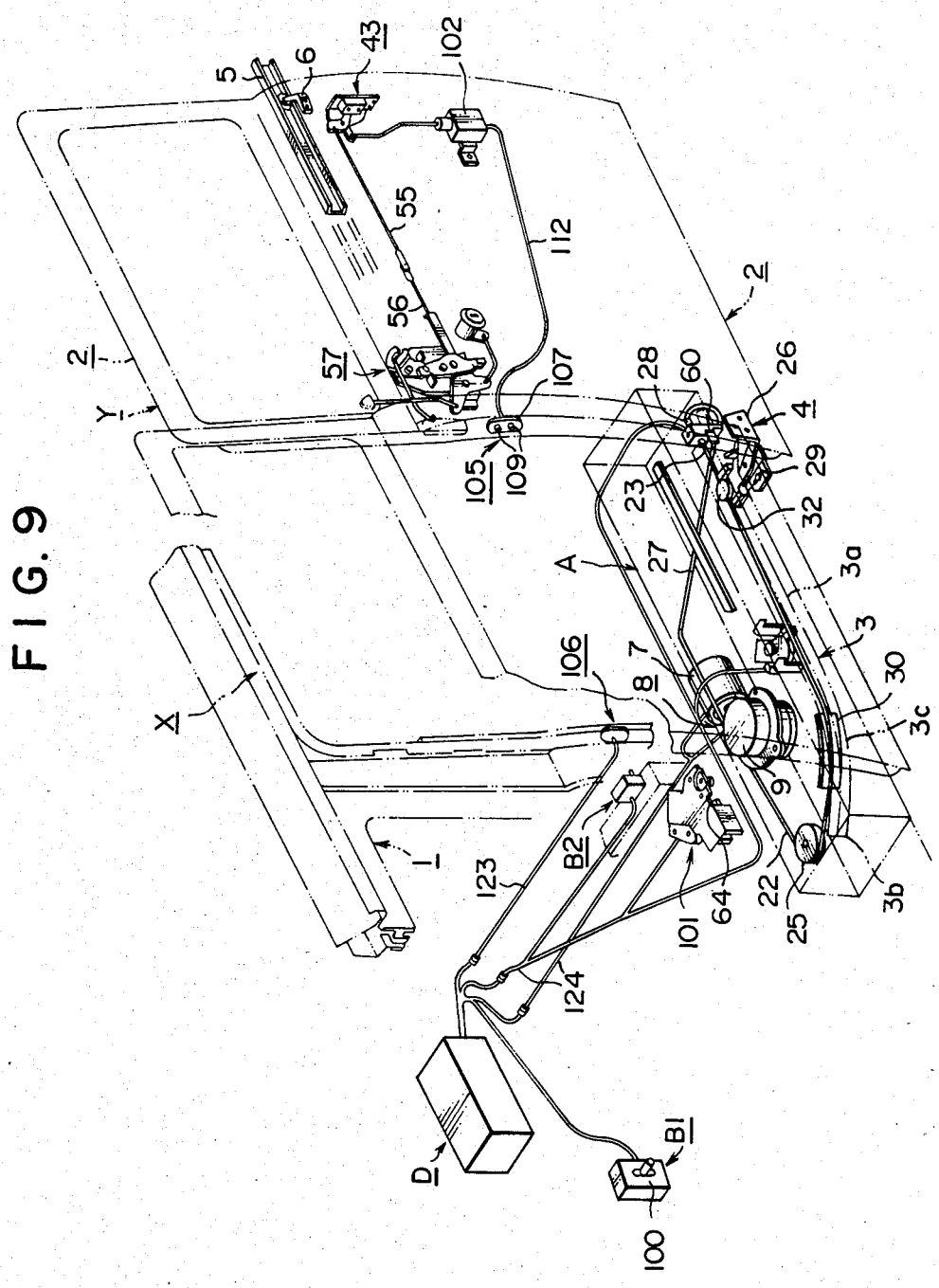
FIG. 9 is a view similar to FIG. 1;, but shows a second embodiment of the system according to the invention.

Referring to FIG. 9, there is shown another embodiment of the automatic sliding system according to the invention, comprising sliding door driving mechanism, operating device B, door lock releasing device C and a control device D, in which the operating means B and the door lock releasing device C are operated electrically, while operations and functions of the sliding door driving mechanism A and the control device D are substantially the same with the first embodiment. The same numerical references are attached to the similar parts to the first embodiment in FIG. 1.

In this embodiment, the operating device B consists of a main device B1 comprising an electrical switch 100, and a subsidiary device B2 which is substantially the same with that of the first embodiment. The switch 100 has a small switching lever which functions substantially the same as the operating handle 37, the lever normally retained at a neutral position and movable to either of the open-door position and the close-door position. Both device B1, B2 are connected to the control device D by electric wires.

The door lock releasing device C of this embodiment consists of an electric coupling 104 comprising a male part 105 and a female part 106, and an actuator 102, wherein the male part mounted on the front end surface 2a of the sliding door 2 is connected through an electric wire 112 to the actuator 102 linked with the door lock 43, and the female part is mounted at a corresponding position to the male part on a part of the body 1 facing to the front end surface of the sliding door when the door is closed and also is connected through an electric wire 123 to the control device D and further to a power supply (not shown). When the sliding door is kept at the closing position X, the male and female parts are joint to contact with each other, as shown in FIG. 11b, to form a continuous feeder from the power supply to the actuator, and the door lock can be released by energizing the actuator through the control device D. This operation is achieved before the sliding door driving mechanism A starts to move the sliding door from the closing position X to the opening position Y.

Figure 10:
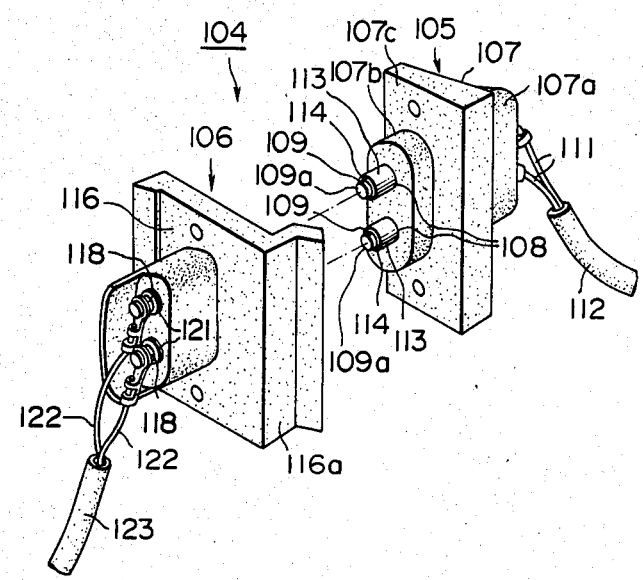
FIG. 10 is a perspective view of an electric coupling used for the second embodiment in FIG. 9.

Referring to FIGS. 10 and 11, the male part 105 and the female part 106 have contacting rods 109 and 118 with holders 113 and 119, both rods retractable into bores 108, 117 formed in bases 107, 116 and always biased outward by springs 115, 120, so that when the door is started to move from the closing position, as shown in FIG. 11c, both rods can be kept in contact with each other for a certain short time so that releasing the door lock 43 is ensured.

It is of course possible in this embodiment to utilize any other conventional couplings which can electrically connect the body and the sliding door when the door is closed, and are separated when the door is opened.

In operation, by moving the switching lever to the open-door position, first the actuator 102 is operated to release the door lock through the control device and the coupling, and then the sliding door driving means A is operated to move the door to the opening position Y. In this embodiment, the control device is provided with a delay circuit which functions such that energizing the actuator precedes energizing the elctromagnetic clutch and the driving means, and accordingly the door lock is released prior to operations of the clutch and the driving means are started.

According to the invention described above, the sliding door can be automatically and safely opened or closed from the driver's seat as well as from outside the vehicle though it is constructed compact.

What is claimed is:

1. An automatic sliding door system for vehicles which consists of:
   (A) a sliding door driving mechanism comprising:
   guide means affixed to a body of a vehicle so as to guide wires along a path for opening and closing movements of a sliding door, one ends of said wires being secured to the sliding door;
   a winding drum mounted to the body to be rotatable in either direction to send the wires along the guide means, in which another ends of said wires being wound round and outer circumference of said drum and secured thereto; and
   a driving motor mounted to the body and operatively connected to said winding drum through a speed reducer and an electromagnetic clutch;
   (B) an operating device mounted on the body for operating opening and closing movements of the sliding door;
   (C) a door lock releasing device comprising two parts, one of which is mounted on the body and connected to the operating device and another one of which is mounted on the sliding door and connected to a door lock of the sliding door, also comprising coupling means for connecting said two parts mechanically or electrically when the door is closed, and by operation of the operating device said door lock releasing device being actuated to release engagement of the door lock prior to starting operation of the sliding door driving mechanism; and
   (D) a control device electrically connected with the driving motor, the electromagnetic clutch and the operating device, and operating to energize the driving motor and the clutch so that the wires are sent in a direction to open the sliding door when the operating device is operated for opening, and also the wires are sent in another direction to close the sliding door when the operating device is operated for closing.

2. An automatic sliding door system as claimed in claim 1, wherein the wires comprise at least two wires, each wire being led from the winding drum in opposite direction to each other, said two wires crossing each other on an inside edge of a bracket affixed to the sliding door and firmly connected at each one end to a front edge and a rear edge of the bracket respectively, thereby the wires forming substantially one loop along the guide means through the bracket.

3. An automatic sliding door system as claimed in claim 1 wherein the electromagnetic clutch has two coils comprising a primary coil 14 and a secondary coil 15, for the most part in opening and closing the sliding door, only the primary coil is operated to connect the electromagnetic clutch, and in closing the sliding door the secondary coil is operated in addition to the primary coil to increase torque capacity of the clutch for transmitting greater driving force when the sliding door comes to a position adjacent to the closing position.

4. An automatic sliding door system as claimed in claim 1, wherein the control device includes a delay circuit which functions such that connecting operation of the clutch precedes operation of the sliding door driving mechanism.

5. An automatic sliding door system as claimed in claim 1, wherein the control device further includes a temporary stop switch 65 which functions, when it is closed, to stop closing movement of the sliding door temporarily for a certain short time.

6. An automatic sliding door system as claimed in claim 1, wherein the operating device comprises:
   (B1) a main operating device mounted nearby a driver's seat inside the body for operating opening and closing movements of the sliding door from the driver's seat; and
   (B2) a subsidiary operating device mounted inside the body at a position adjacent to the sliding door to be operated from outside the body when the door is opening, and including at least a door-closing switch 41 for closing the sliding door.

7. An automatic sliding door system as claimed in claim 6, wherein the main operating device comprises:
   a base plate 35 affixed to the body;
   an operating handle 37 mounted to said base to be normally retained at a neutral position and selectively moved from the neutral position to an open-door position and to a close-door position opposite to said open-door position;
   a door-opening switch 38 mounted on the base to be actuated when said handle is moved to the open-door position; and
   a door-closing switch 39 mounted on the base to be actuated when said handle is moved to the close-door position.

8. An automatic sliding door system as claimed in claims 6 or 7, wherein the subsidiary operating device also includes an emergency reverse switch 42 which is operated during closing movement of the sliding door for promptly reversing movement of the sliding door which is moving to the closing position back to the opening position.

9. An automatic sliding door system as claimed in claim 7, wherein the door lock releasing device includes a mechanical link mechanism for mechanically connecting the operating handle and a release lever of the door lock through said coupling means, and thereby the door lock can be released through a mechanical stroke of the operating handle provided from the neutral position to a position adjacent to the open-door position.

10. An automatic sliding door system as claimed in claim 7, wherein the operating handle is a switching lever.

11. An automatic sliding door system as claimed in claim 10, wherein the door lock releasing device has an electric actuator mounted inside the sliding door and linked with the door lock, said actuator is electrically connected through the coupling means and the control device to the door-opening switch when the sliding door is maintained at the closing position, so that the actuator can be actuated to release the door lock by moving the switching lever to the open-door position.

12. An automatic sliding door system as claimed in claim 11, wherein the control device further includes another delay circuit which functions such that when the switching lever is moved to the open-door position, operation of the actuator precedes operations of the electromagnetic clutch and the sliding door driving mechanism.

* * * * *